US010728895B2

(12) United States Patent
Sun et al.

(10) Patent No.: US 10,728,895 B2
(45) Date of Patent: Jul. 28, 2020

(54) SLOT FORMAT INDICATOR IN FREQUENCY DIVISION DUPLEXING

(71) Applicant: QUALCOMM Incorporated, San Diego, CA (US)

(72) Inventors: Jing Sun, San Diego, CA (US); Heechoon Lee, San Diego, CA (US); Yang Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/201,303

(22) Filed: Nov. 27, 2018

(65) Prior Publication Data

US 2019/0174487 A1 Jun. 6, 2019

Related U.S. Application Data

(60) Provisional application No. 62/593,873, filed on Dec. 1, 2017.

(51) Int. Cl.
*H04L 5/14* (2006.01)
*H04W 72/04* (2009.01)
*H04L 5/00* (2006.01)

(52) U.S. Cl.
CPC ....... *H04W 72/0446* (2013.01); *H04L 5/0005* (2013.01); *H04L 5/0053* (2013.01); *H04L 5/0091* (2013.01); *H04L 5/1469* (2013.01)

(58) Field of Classification Search
CPC ............. H04W 72/0446; H04L 5/0091; H04L 5/1469; H04L 5/0053; H04L 5/0005
See application file for complete search history.

(56) References Cited

U.S. PATENT DOCUMENTS

2019/0150142 A1* 5/2019 Huang .............. H04W 72/1289
2019/0312958 A1* 10/2019 Zhang .............. H04W 72/0446
2019/0342944 A1* 11/2019 Chatterjee .......... H04W 72/044

OTHER PUBLICATIONS

3GPP500, Nov. 2017, (Summary from offline FDD related aspects, R1-1721500).*
3GPP368, Nov. 2017, (Summary—Aspects related to FDD, R1-1721368).*
International Search Report and Written Opinion—PCT/US2018/062771—ISA/EPO—Mar. 26, 2019.
Zte., et al., "Summary AI 7.7-Aspects Related to FDD", 3GPP Draft; R1-1721368 Summary AI 7.7-Aspects Related to FDD, 3rd Generation Partnership Project (3GPP), Mobile Competence Centre, 650, Route Des Lucioles, F-06921 Sophia-Antipolis Cedex, France, vol. RAN WG1. No. Reno, USA; Nov. 28, 2017 (Nov. 28, 2017), XP051363849, pp. 1-8, Retrieved from the Internet: URL: http://www.3gpp.org/ftp/Meetings_3GPP_SYNC/RAN1/Docs/ [retrieved on Nov. 28, 2017], Fourth item of Table, p. 2.

(Continued)

*Primary Examiner* — Lakeram Jangbahadur
(74) *Attorney, Agent, or Firm* — Holland & Hart LLP/Qualcomm

(57) ABSTRACT

Methods, systems, and devices for wireless communications are described. A user equipment (UE) may receive a time division duplexing (TDD) multi-slot slot format indicator (SFI) for a set of slots. The UE may identify that the UE is operating in a frequency division duplexing (FDD) mode. The UE may determine, based on the FDD mode and the TDD multi-slot SFI, a downlink slot format and an uplink slot format for a subset of the set of slots.

32 Claims, 10 Drawing Sheets

(56) References Cited

OTHER PUBLICATIONS

Zte., et al., "Summary From Offline FDD Related Aspects", 3GPP Draft; R1-1721500 Summary From Offline Tuesday Morning Al 7_7, 3rd Generation Partnership Project (3GPP), Mobile Competence Centre, 650, Route Des Lucioles, F-06921 Sophia-Antipolis Cedex, France, vol. RAN WG1. No. Reno, USA; 20171127-20171201, Nov. 29, 2017 (Nov. 29, 2017), XP051364017, pp. 1-4, Retrieved from the Internet: URL: http://www.3gpp.org/ftp/Meetings_3GPP_SYNC/RAN1/Docs/ [retrieved on Nov. 29, 2017], Issue #4 (3rd-5th Items), p. 2.

* cited by examiner

SLOT FORMAT INDICATOR IN FREQUENCY DIVISION DUPLEXING

CROSS REFERENCES

The present Application for Patent claims the benefit of U.S. Provisional Patent Application No. 62/593,873 by SUN, et al., entitled "SLOT FORMAT INDICATOR IN FREQUENCY DIVISION DUPLEXING" filed Dec. 1, 2017, which is assigned to the assignee hereof and is expressly incorporated herein by reference in its entirety.

BACKGROUND

The following relates generally to wireless communication, and more specifically to slot format indicator (SFI) in frequency division duplexing (FDD).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Certain wireless communication systems may be configured to support time division duplexing (TDD) SFI indication. Generally, the TDD SFI may be a bit (or set of bits) that correspond to a TDD table. In some aspects, the TDD table may have a plurality of rows, where each row corresponds to a slot format for a slot. Each column of the TDD table may correspond to a symbol of the slot. Generally, each row may be configured with an indication, for each symbol, of whether that symbol is configured for uplink communications (U), for downlink communications (D), or is unknown (X). Accordingly, a UE receiving the TDD SFI will use the SFI to access the TDD table and determine how each symbol is configured for the slot.

SUMMARY

The described techniques relate to improved methods, systems, devices, or apparatuses that support slot format indicator (SFI) in frequency division duplexing (FDD). Generally, the described techniques provide for use of a time division duplexing (TDD) SFI (or TDD multi-slot SFI) when determining the slot format in an FDD scenario. As one example for a TDD SFI scenario, the user equipment (UE) may receive the TDD SFI indication for a slot. The UE, however, may identify that it is operating in an FDD mode. The FDD mode may include the UE performing uplink communications using an uplink bandwidth part (BWP) and downlink communications using a downlink BWP. The UE may apply a lengthening factor to each symbol format of the slot format indicated in the TDD SFI. For example, the UE may double each symbol format such that a downlink (D) entry for a first symbol would become a D entry for the first and second symbols. As another example, an uplink (U) entry for a fifth symbol may be doubled such that (assuming the first four symbols where also doubled) the ninth and tenth symbols would then become U entries. Accordingly, the slot format indicated in the TDD SFI, which might describe the format for 14 symbols, would be translated such that the slot format now covers 28 symbols, with the first 14 symbol formats corresponding to the downlink BWP and the next 14 symbols corresponding to the uplink BWP, or vice versa.

As another example in TDD multi-slot SFI scenario, the UE may receive the indication of the TDD multi-slot SFI which identifies an entry in a multi-slot SFI table. The TDD multi-slot SFI may be associated with multiple slots (e.g., a set of slots). The entry in the multi-slot SFI table may include a plurality of SFIs, e.g., an SFI for each slot of the set of slots. The UE, however, may identify that it is operating in an FDD mode. The FDD mode may include the UE performing uplink communications using an uplink BWP and downlink communications using a downlink BWP. The UE may apply a translation metric to the entry in the multi-slot SFI table such that the UE determines a downlink slot format and an uplink slot format for a subset of the slots from the TDD multi-slot SFI. Thus, the UE may reinterpret the entries in the multi-slot SFI table and apply the SFIs from a first portion of the entry for downlink communications in the downlink BWP and apply the SFIs from a second portion of the entry for uplink communications during a subset of the slots associated with the TDD multi-slot SFI.

A method of wireless communication is described. The method may include receiving a TDD SFI for a slot, identifying that the UE is operating in an FDD mode, and determining, based on the FDD mode, a downlink slot format and an uplink slot format from the TDD SFI.

An apparatus for wireless communication is described. The apparatus may include means for receiving a TDD SFI for a slot, means for identifying that the UE is operating in an FDD mode, and means for determining, based on the FDD mode, a downlink slot format and an uplink slot format from the TDD SFI.

Another apparatus for wireless communication is described. The apparatus may include a processor, memory in electronic communication with the processor, and instructions stored in the memory. The instructions may be operable to cause the processor to receive a TDD SFI for a slot, identify that the UE is operating in an FDD mode, and determine, based on the FDD mode, a downlink slot format and an uplink slot format from the TDD SFI.

A non-transitory computer-readable medium for wireless communication is described. The non-transitory computer-readable medium may include instructions operable to cause a processor to receive a TDD SFI for a slot, identify that the UE is operating in an FDD mode, and determine, based on the FDD mode, a downlink slot format and an uplink slot format from the TDD SFI.

Some examples of the method, apparatus, and non-transitory computer-readable medium described above may further include processes, features, means, or instructions for performing downlink communications during the slot in accordance with the downlink slot format. Some examples of the method, apparatus, and non-transitory computer-readable medium described above may further include processes, features, means, or instructions for performing uplink communications during the slot in accordance with the uplink slot format.

In some examples of the method, apparatus, and non-transitory computer-readable medium described above, determining the downlink slot format and the uplink slot format may include extending a length of each symbol format of the TDD SFI by a defined factor.

In some examples of the method, apparatus, and non-transitory computer-readable medium described above, determining the downlink slot format may include determining that a symbol format occurring in a first portion of the TDD SFI corresponds to an uplink symbol format. Some examples of the method, apparatus, and non-transitory computer-readable medium described above may further include processes, features, means, or instructions for omitting the symbol format from the downlink slot format.

In some examples of the method, apparatus, and non-transitory computer-readable medium described above, determining the uplink slot format may include determining that a symbol format occurring in a second portion of the TDD SFI corresponds to a downlink symbol format. Some examples of the method, apparatus, and non-transitory computer-readable medium described above may further include processes, features, means, or instructions for omitting the symbol format from the uplink slot format.

A method of wireless communication is described. The method may include receiving a TDD multi-slot SFI for a set of slots, identifying that a UE is operating in an FDD mode, and determining, based on the FDD mode and the TDD multi-slot SFI, a downlink slot format and an uplink slot format for a subset of the set of slots.

An apparatus for wireless communication is described. The apparatus may include means for receiving a TDD multi-slot SFI for a set of slots, means for identifying that a UE is operating in an FDD mode, and means for determining, based on the FDD mode and the TDD multi-slot SFI, a downlink slot format and an uplink slot format for a subset of the set of slots.

Another apparatus for wireless communication is described. The apparatus may include a processor, memory in electronic communication with the processor, and instructions stored in the memory. The instructions may be operable to cause the processor to receive a TDD multi-slot SFI for a set of slots, identify that a UE is operating in an FDD mode, and determine, based on the FDD mode and the TDD multi-slot SFI, a downlink slot format and an uplink slot format for a subset of the set of slots.

A non-transitory computer-readable medium for wireless communication is described. The non-transitory computer-readable medium may include instructions operable to cause a processor to receive a TDD multi-slot SFI for a set of slots, identify that a UE is operating in an FDD mode, and determine, based on the FDD mode and the TDD multi-slot SFI, a downlink slot format and an uplink slot format for a subset of the set of slots.

Some examples of the method, apparatus, and non-transitory computer-readable medium described above may further include processes, features, means, or instructions for performing downlink communications during the subset of the set of slots in accordance with the downlink slot format. Some examples of the method, apparatus, and non-transitory computer-readable medium described above may further include processes, features, means, or instructions for performing uplink communications during the subset of the set of slots in accordance with the uplink slot format.

In some examples of the method, apparatus, and non-transitory computer-readable medium described above, determining the downlink slot format and the uplink slot format may include determining the downlink slot format based on a first portion of the TDD multi-slot SFI and determining the uplink slot format based on a second portion of the TDD multi-slot SFI.

In some examples of the method, apparatus, and non-transitory computer-readable medium described above, determining the downlink slot format and the uplink slot format may include determining the downlink slot format based on one or more slot format indicators for a first group of slots of the set and determining the uplink slot format based on one or more slot format indicators for a second group of slots of the set. In some examples of the method, apparatus, and non-transitory computer-readable medium described above, the first group of slots of the set may include one or more odd-numbered slots of the set and the second group of slots of the set may include one or more even-numbered slots of the set. In some examples of the method, apparatus, and non-transitory computer-readable medium described above, slots of the first group of slots and slots of the second group of slots alternate within the set of slots.

In some examples of the method, apparatus, and non-transitory computer-readable medium described above, determining the downlink slot format and the uplink slot format may include determining a first slot format indicator for a first slot of the set and a second slot format indicator for a second slot of the set, where the first slot precedes the second slot and allocating the first slot format indicator as the downlink slot format for the first slot and the second slot format indicator as the uplink slot format for the first slot. In some examples of the method, apparatus, and non-transitory computer-readable medium described above, the first slot may immediately precede the second slot. Some examples of the method, apparatus, and non-transitory computer-readable medium described above may further include processes, features, means, or instructions for determining a third slot format indicator for a third slot of the set and a fourth slot format indicator for a fourth slot of the set, where the third slot precedes the fourth slot and allocating the third slot format indicator as the downlink slot format for the second slot and the fourth slot format indicator as the uplink slot format for the second slot.

Some examples of the method, apparatus, and non-transitory computer-readable medium described above may further include processes, features, means, or instructions for communicating with a base station based on the downlink slot format or the uplink slot format.

DETAILED DESCRIPTION

Figure 1:
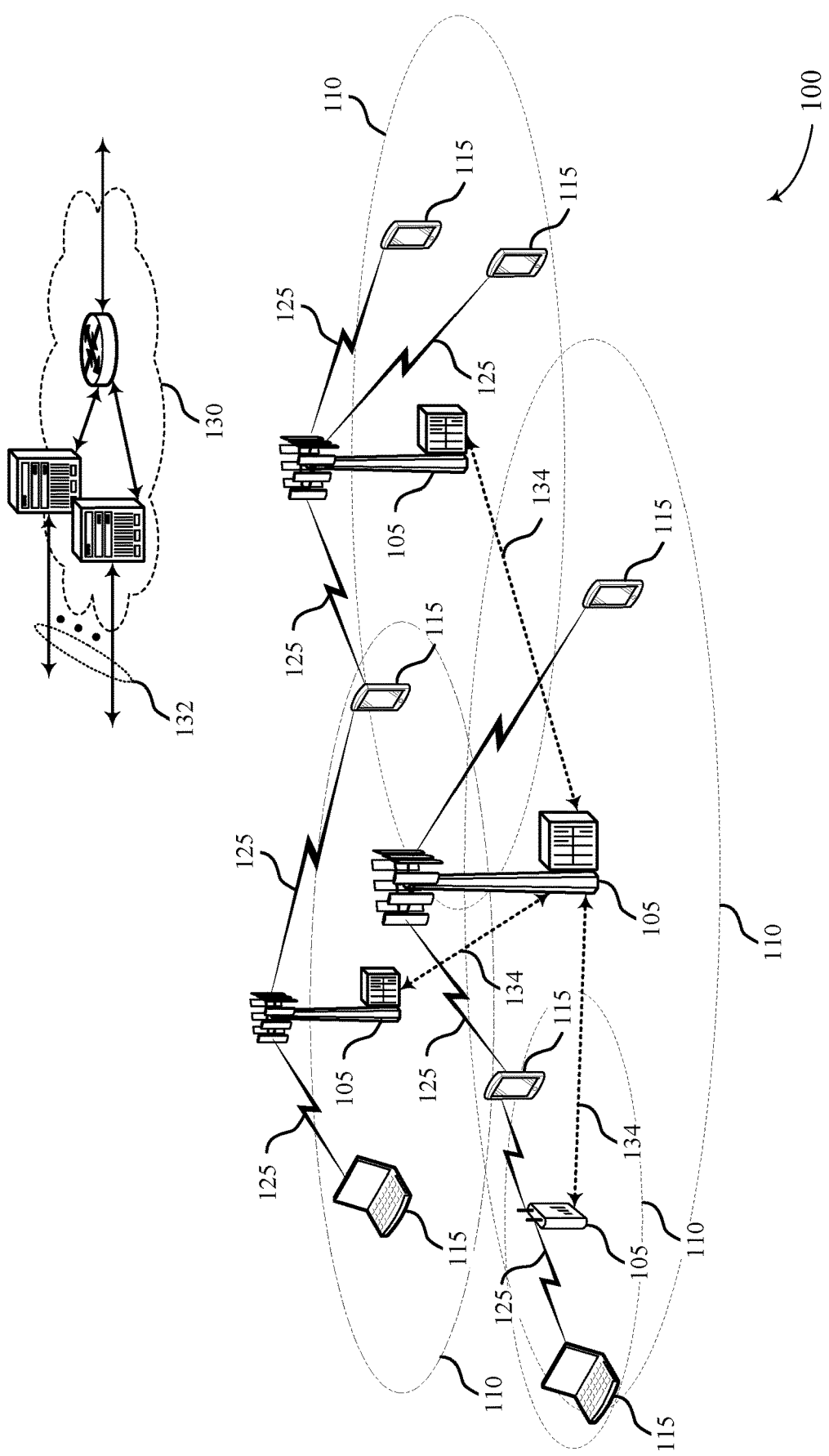
FIG. 1 illustrates an example of a system for wireless communication that supports SFI in FDD in accordance with aspects of the present disclosure.

Certain wireless communication systems may be configured to support time division duplexing (TDD) slot format indicator (SFI) indication. Generally, the TDD SFI may be a bit (or set of bits) that correspond to a TDD table. In some aspects, the TDD table may have a plurality of rows, where each row corresponds to a slot format for a slot. Each column of the TDD table may correspond to a symbol of the slot. Generally, each row may be configured with an indication, for each symbol, of whether that symbol is configured for uplink communications (U), for downlink communications (D), or is unknown (X). Accordingly, a UE receiving the TDD SFI will use the SFI to access the TDD table and determine how each symbol is configured for the slot.

In a TDD multi-slot SFI scenario, the SFI indication may be one or more bits that correspond to an entry in a TDD multi-slot SFI. A row in the TDD multi-slot SFI may include multiple entries that correspond to a set of SFIs, and each SFI may correspond to a row of a TDD table. Thus, the UE may receive the TDD multi-slot SFI and identify the entries in the TDD multi-slot SFI. From the entries, the UE may determine which rows in the TDD table are indicated for the associated slots, and then use the indicated rows during the slots associated with the TDD multi-slot SFI.

Aspects of the disclosure are initially described in the context of a wireless communications system. The described techniques provide for use of a time division duplexing (TDD) SFI (or TDD multi-slot SFI) when determining the slot format in an FDD scenario. As one example for a TDD SFI scenario, the user equipment (UE) may receive the TDD SFI indication for a slot. The UE, however, may identify that it is operating in an FDD mode. The FDD mode may include the UE performing uplink communications using an uplink bandwidth part (BWP) and downlink communications using a downlink BWP. The UE may apply a lengthening factor to each symbol format of the slot format indicated in the TDD SFI. For example, the UE may double each symbol format such that a downlink (D) entry for a first symbol would become a D entry for the first and second symbols. As another example, an uplink (U) entry for a fifth symbol may be doubled such that (assuming the first four symbols where also doubled) the ninth and tenth symbols would then become U entries. Accordingly, the slot format indicated in the TDD SFI, which might describe the format for 14 symbols, would be translated such that the slot format now covers 28 symbols, with the first 14 symbol formats corresponding to the downlink BWP and the next 14 symbols corresponding to the uplink BWP, or vice versa.

As another example in TDD multi-slot SFI scenario, the UE may receive a TDD multi-slot SFI. In some cases, the TDD multi-slot SFI may include multiple entries which may be associated with a TDD multi-slot SFI table. The TDD multi-slot SFI may be associated with multiple slots (e.g., a set of slots) in some cases. The row in the TDD multi-slot SFI may include a plurality of SFIs, e.g., an SFI for each slot of the set of slots. The UE, however, may identify that it is operating in an FDD mode. The FDD mode may include the UE performing uplink communications using an uplink BWP and downlink communications using a downlink BWP. The UE may apply a translation metric to the multiple entries in the TDD multi-slot SFI such that the UE may determine a downlink slot format and an uplink slot format for a subset of the set of slots from the TDD multi-slot SFI. Thus, the UE may reinterpret the entries in the TDD multi-slot SFI and apply the SFIs from a first portion of the entries for downlink communications in the downlink BWP and apply the SFIs from a second portion of the entries for uplink communications during a subset of the set of slots associated with the TDD multi-slot SFI.

Aspects of the disclosure are further illustrated by and described with reference to apparatus diagrams, system diagrams, and flowcharts that relate to SFI in FDD.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink (UL) transmissions from a UE 115 to a base station 105, or downlink (DL) transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some aspects, a UE 115 may receive a TDD SFI for a slot. The UE 115 may identify that the UE 115 is operating in an FDD mode. The UE 115 may determine, based on the FDD mode, a downlink slot format and an uplink slot format from the TDD SFI.

In some aspects, a UE 115 may receive a TDD multi-slot SFI for a set of slots. The UE 115 may identify that the UE 115 is operating in an FDD mode. The UE 115 may determine, based on the FDD mode and the TDD multi-slot SFI, a downlink slot format and an uplink slot format for a subset of the set of slots.

Figure 2:
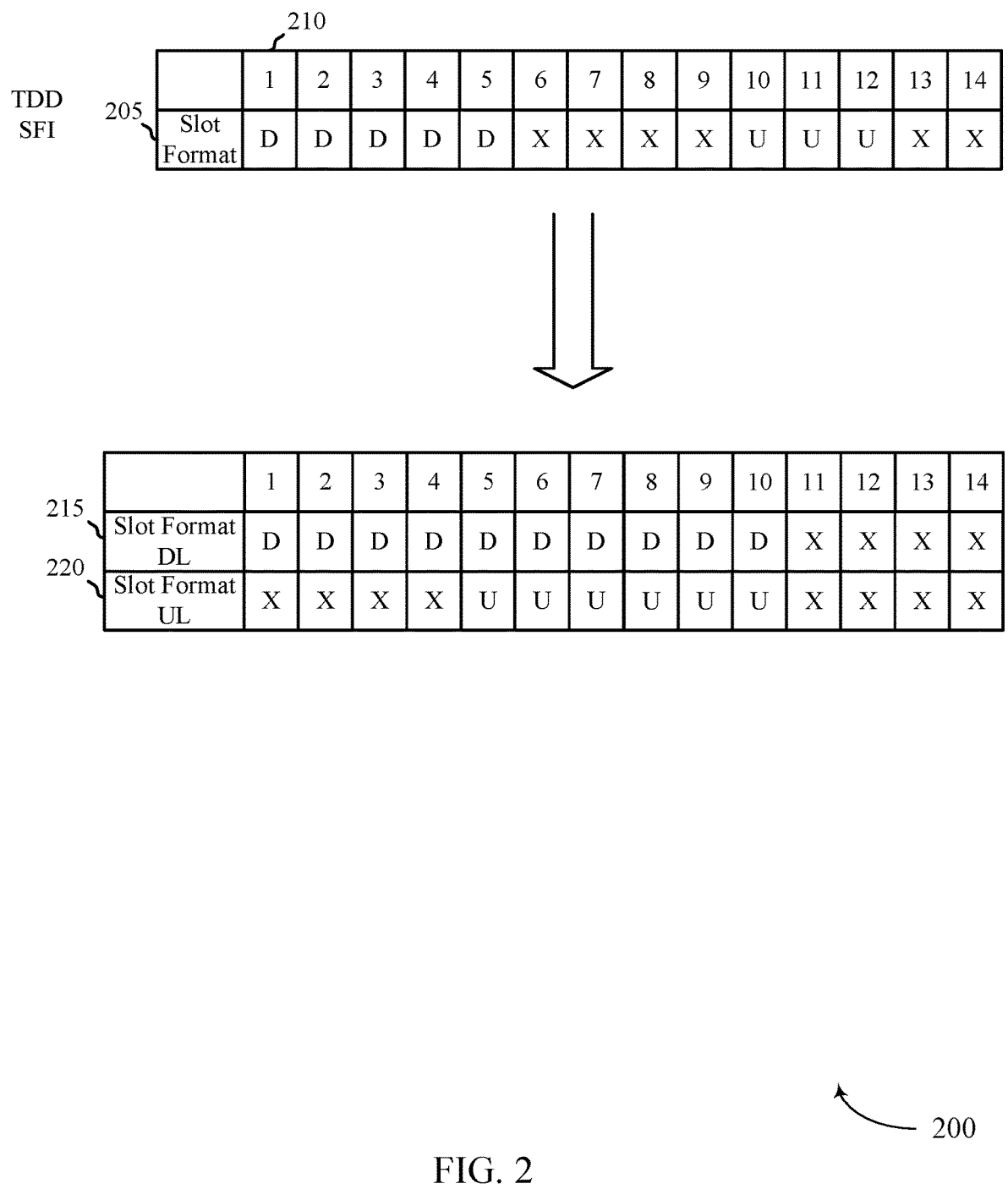
FIG. 2 illustrates an example of a slot format that supports SFI in FDD in accordance with aspects of the present disclosure.

FIG. 2 illustrates an example of a slot format 200 that supports SFI in FDD in accordance with various aspects of the present disclosure. In some examples, the slot format 200 may implement aspects of wireless communication system 100. Aspects of the slot format 200 may be implemented by a UE and/or base station, which may be examples of the corresponding devices described herein.

Generally, a UE may receive an indication of a TDD SFI for a slot. Each column of the TDD SFI may be associated with a symbol (e.g., symbol 210). The row of the TDD SFI may be associated with a slot format (e.g., slot format 205) for a slot. For each symbol 210 of slot format 205, the symbol may be configured for downlink (D) communications, uplink (U) communications, or unknown (X). Thus, conventionally the UE would receive the bit(s) indicating the TDD SFI and use the index to access a TDD table. The TDD table would include a plurality of rows, with each row corresponding to a particular slot format. It is to be understood that the slot format 205 is one example of what a slot format might be. However, other slot formats may be used in accordance with aspects of the present disclosure.

The UE may identify that it is operating in an FDD mode. The FDD mode may include the UE performing uplink communications on an uplink BWP and downlink communications on a downlink BWP. A BWP may generally refer to a bandwidth that is available for the UE to use for communications. The UE may use the full BWP or a portion of the BWP, e.g., depending upon the communication needs, battery power of the UE. Thus, references to a BWP may refer to the portion of the BWP (e.g., all or some of the available BWP) that the UE uses for communications.

The UE may use the TDD SFI to determine a downlink slot format 215 to use for the downlink communications on the downlink BWP and determine an uplink slot format 220 to use for the uplink communications on the uplink BWP. In some aspects, this may include the UE extending a length of each symbol format of the TDD slot format by a defined factor (e.g., a factor of two or doubling). As the slot format indicated in the TDD SFI includes fourteen symbols, extending the length of each symbol format of the TDD slot format by a factor of two would cover 28 symbols. The 28 symbols may be divided such that the first fourteen are used for the downlink slot format 215 and the second fourteen are used for the uplink slot format 220.

Thus, in the example slot format 200, the D format for symbol 1 of the TDD slot format may be extended to a D format for the symbols 1 and 2 of the downlink slot format 215. The D format for symbol 2 of the TDD slot format may be extended to a D format for symbols 3 and 4 of the downlink slot format 215. This process may continue for all of the formats of all of the symbols of the TDD slot.

In some aspects, the formats of the symbols of the TDD slot format may be omitted. For example, if any of symbols 1-7 were configured for U communication in the TDD slot format, then that U configuration might be changed (e.g., to an X or a D) before the symbol format is extended. Correspondingly, if any of the symbols 8-14 were configured for D communications in the TDD slot format, then that D configuration might be changed (e.g., to an X or a U) before the symbol format is extended.

Thus, in some aspects, the UE may automatically translate a row to an FDD format, but double the length of each entry, e.g., D becomes DD, U becomes UU, and X becomes XX. This may result in 28 entries (from a 14 symbol slot). Then, the first 14 entries may be applied to the downlink BWP, and the last 14 entries may be applied to the uplink BWP. In some aspects, not all original 14 entries may be useful. For example, entries with D may not show up in the last 7 symbols and entries with U may not show up in the first 7 symbols.

Figure 3:
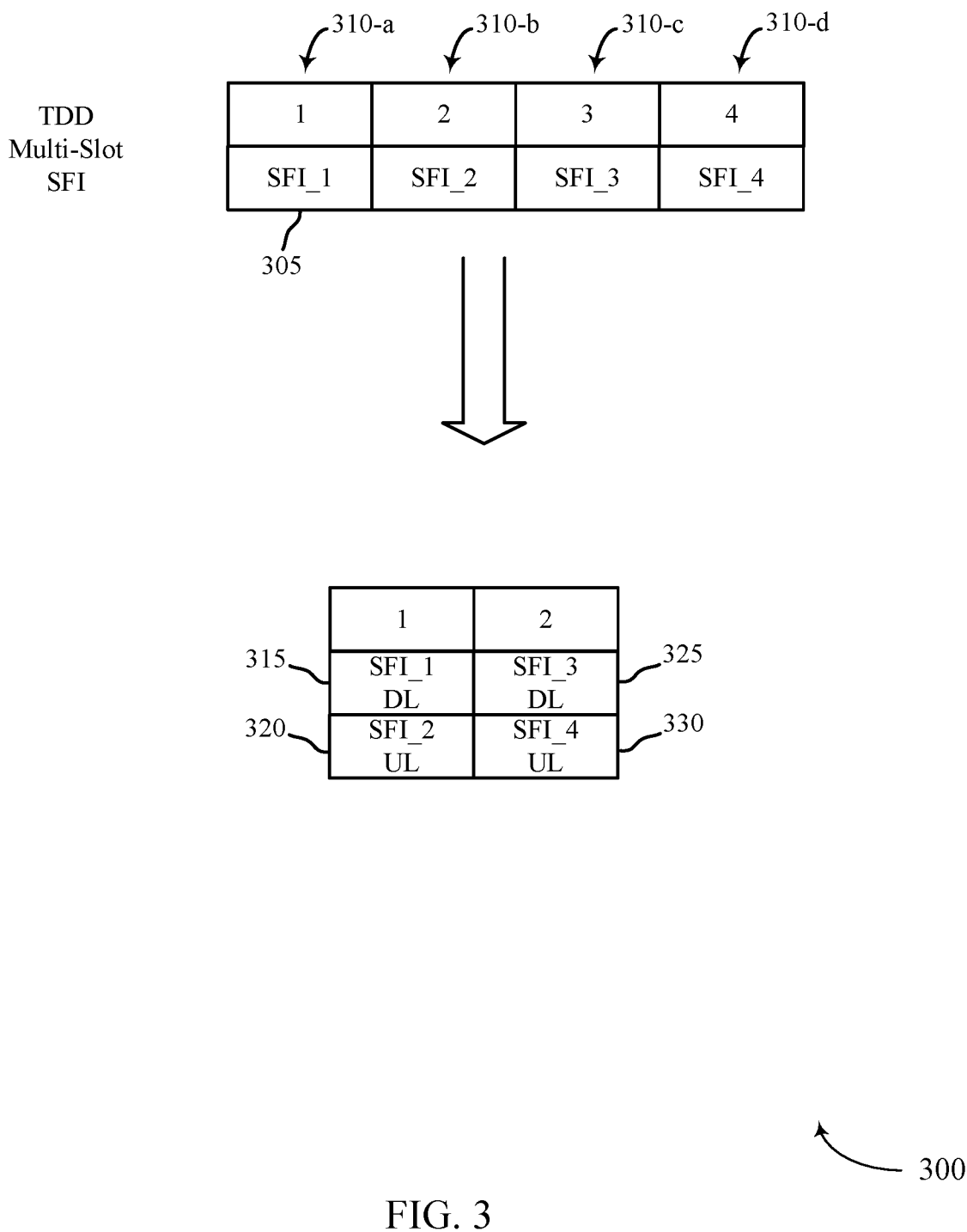
FIG. 3 illustrates an example of a slot format that supports SFI in FDD in accordance with aspects of the present disclosure.

FIG. 3 illustrates an example of a slot format 300 that supports SFI in FDD in accordance with various aspects of the present disclosure. In some examples, slot format 300 may implement aspects of wireless communication system 100 and/or slot format 200. Aspects of slot format 300 may be implemented by a UE and/or base station, which may be examples of the corresponding devices described herein.

Generally, a UE may receive an indication of a TDD multi-slot SFI for a set of slots. Each column of the TDD multi-slot SFI (e.g., column 310-*a*) may be associated with a slot (e.g., slot 1) and may indicate the slot format for the slot (e.g., slot 1). The row of the TDD multi-slot SFI may include multiple entries (e.g., entry 305 may be an example of the multiple entries) that may be associated with a TDD multi-slot SFI table. In some cases, each row of the TDD multi-slot SFI may be referred to as an entry. Thus, the UE may receive the TDD multi-slot SFI and access the TDD multi-slot SFI table. The TDD multi-slot SFI table would include a plurality of rows corresponding to the multiple entries (e.g., entry 305). Each row of the plurality of rows in the TDD multi-slot SFI table (e.g., a row of the plurality of rows in the TDD multi-slot SFI table corresponding to entry 305 of the TDD multi-slot SFI) would include an SFI for a plurality of symbols in a slot (e.g., slot 1). The UE may then access a TDD multi-slot SFI table to identify the slot format for each slot based on the entry (e.g., entry 305). In the example TDD multi-slot SFI of FIG. 3, the row (e.g., the row including entry 305) may be for four slots (e.g., slots 1 through 4) and include an SFI (e.g., SFI 1) for a first slot (e.g., slot 1), an SFI (e.g., SFI 2) for a second slot (e.g., slot 2), an SFI (e.g., SFI 3) for a third slot (e.g., slot 3), and an SFI (e.g., SFI 4) for a fourth slot (e.g., slot 4).

The UE may identify that it is operating in an FDD mode. The FDD mode may include the UE performing uplink communications on an uplink BWP and downlink communications on a downlink BWP. A BWP may generally refer to a bandwidth that is available for the UE to use for communications. The UE may use the full BWP or a portion of the BWP, e.g., depending upon the communication needs, battery power of the UE. Thus, references to a BWP may refer to the portion of the BWP (e.g., all or some of the available BWP) that the UE uses for communications.

The UE may use the TDD multi-slot SFI to determine a downlink slot format and an uplink slot format for a subset of the slots. For example, the UE may determine a downlink slot format 315 to use for the downlink communications on the downlink BWP during slot 1. The UE may determine an uplink slot format 320 to use for the uplink communications on the uplink BWP during slot 1. The UE may determine a downlink slot format 325 to use for the downlink communications on the downlink BWP during slot 2. The UE may determine an uplink slot format 330 to use for the uplink communications on the uplink BWP during slot 2.

Thus, in the example slot format 300, the slot format for slot 1 (e.g., SFI 1) indicated by the TDD multi-slot SFI may be used for downlink communications during slot 1. The slot format for slot 2 (e.g., SFI 2) indicated by the TDD multi-slot SFI may be used for uplink communications during slot 1. The slot format for slot 3 (e.g., SFI 3) indicated by the TDD multi-slot SFI may be used for downlink communications during slot 2. The slot format for slot 4 (e.g., SFI 4) indicated by the TDD multi-slot SFI may be used for uplink communications during slot 2.

Thus, in some aspects, the UE may use TDD multi-slot SFI configuration to support FDD. For example, for each slot in an FDD mode, the UE may need to configure 2 slots of SFI, one applying to DL BWP and the other applying to UL BWP. As one example, for TDD the base station can configure TDD multi-slot SFI with Entry 1: A,B,C,D; Entry 2: E,F,G,H; and so on. In this example, two multi-slot formats are defined, and 1 bit multi-slot SFI indication may be used. The format may be applied to 4 slots for the TDD mode of operations. However, in an FDD mode, the base station may configure TDD multi-slot SFI with the following—Entry 1: A,B,C,D; Entry 2: E,F,G,H; and so on. In this case, two multi-slot formats may be defined, and 1 bit multi-slot SFI indication may be used. The format may be applied to two slots in the FDD mode. For example, Format 1: A may be applied for DL in slot 0, B may be applied for UL in slot 0, C may be applied for DL in slot 1, and D may be applied for UL in slot 1.

Figure 4:
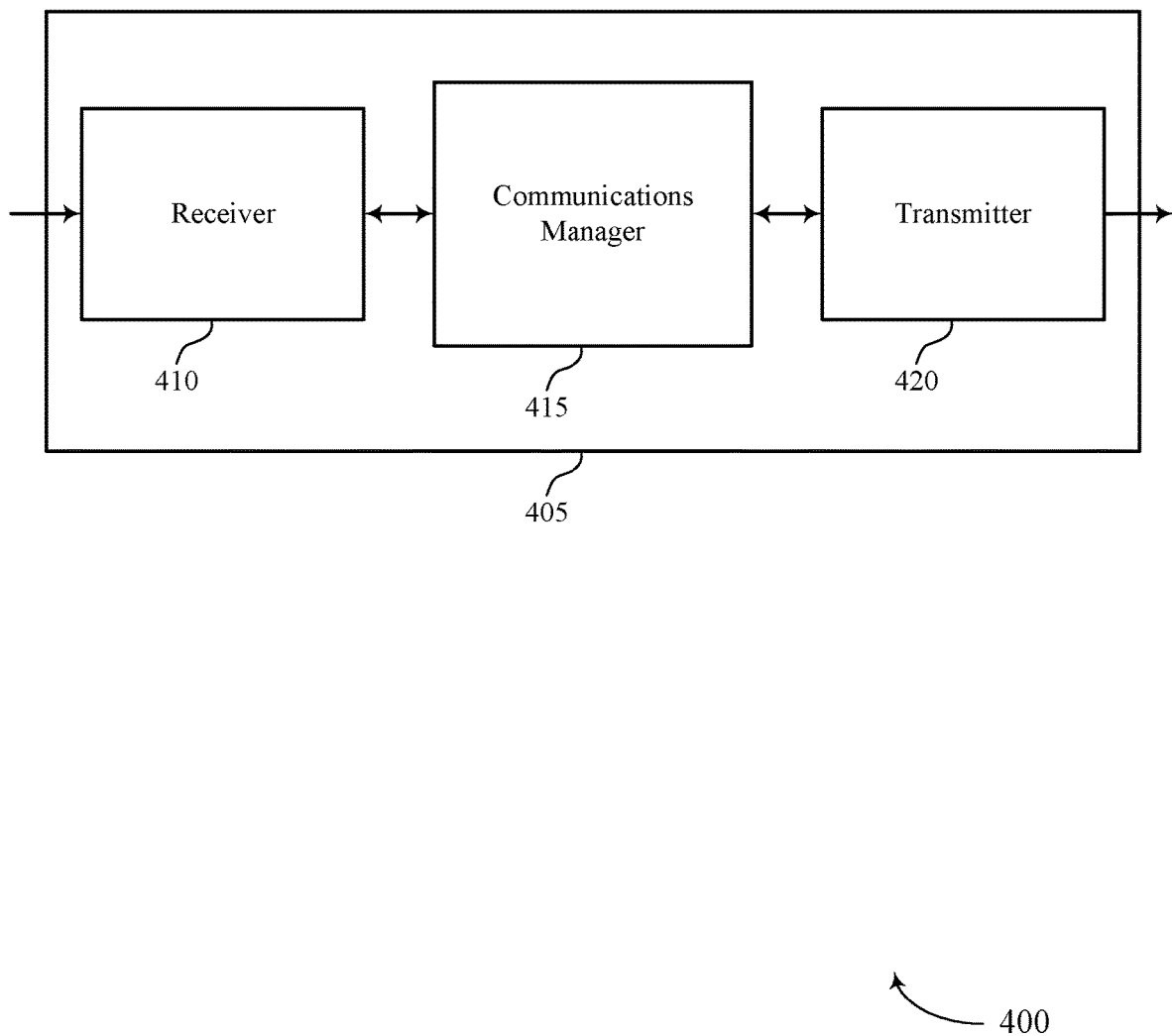
FIGS. 4 through 6 show block diagrams of a device that supports SFI in FDD in accordance with aspects of the present disclosure.

FIG. 4 shows a block diagram 400 of a wireless device 405 that supports SFI in FDD in accordance with aspects of the present disclosure. Wireless device 405 may be an example of aspects of a UE 115 as described herein. Wireless device 405 may include receiver 410, communications manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, information related to SFI in FDD). Information may be passed on to other components of the device. The receiver 410 may be an example of aspects of the transceiver 735 described with reference to FIG. 7. The receiver 410 may utilize a single antenna or a set of antennas.

Communications manager 415 may be an example of aspects of the communications manager 715 described with reference to FIG. 7.

Communications manager 415 and/or at least some of its various sub-components may be implemented in hardware, software executed by a processor, firmware, or any combination thereof. If implemented in software executed by a processor, the functions of the communications manager 415 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 415 and/or at least some of its various sub-components may be physically located at various positions, including being distributed such that portions of functions are implemented at different physical locations by one or more physical devices. In some examples, communications manager 415 and/or at least some of its various sub-components may be a separate and distinct component in accordance with various aspects of the present disclosure. In other examples, communications manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 415 may receive a TDD SFI for a slot, identify that a UE is operating in an FDD mode, and determine, based on the FDD mode, a downlink slot format and an uplink slot format from the TDD SFI. The communications manager 415 may also receive a TDD multi-slot SFI for a set of slots, identify that a UE is operating in an FDD mode, and determine, based on the FDD mode and the TDD multi-slot SFI, a downlink slot format and an uplink slot format for a subset of the set of slots.

Transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may utilize a single antenna or a set of antennas.

In some cases, transmitter 420, in conjunction with receiver 410, may communicate with a base station based on the downlink slot format or the uplink slot format.

Figure 5:
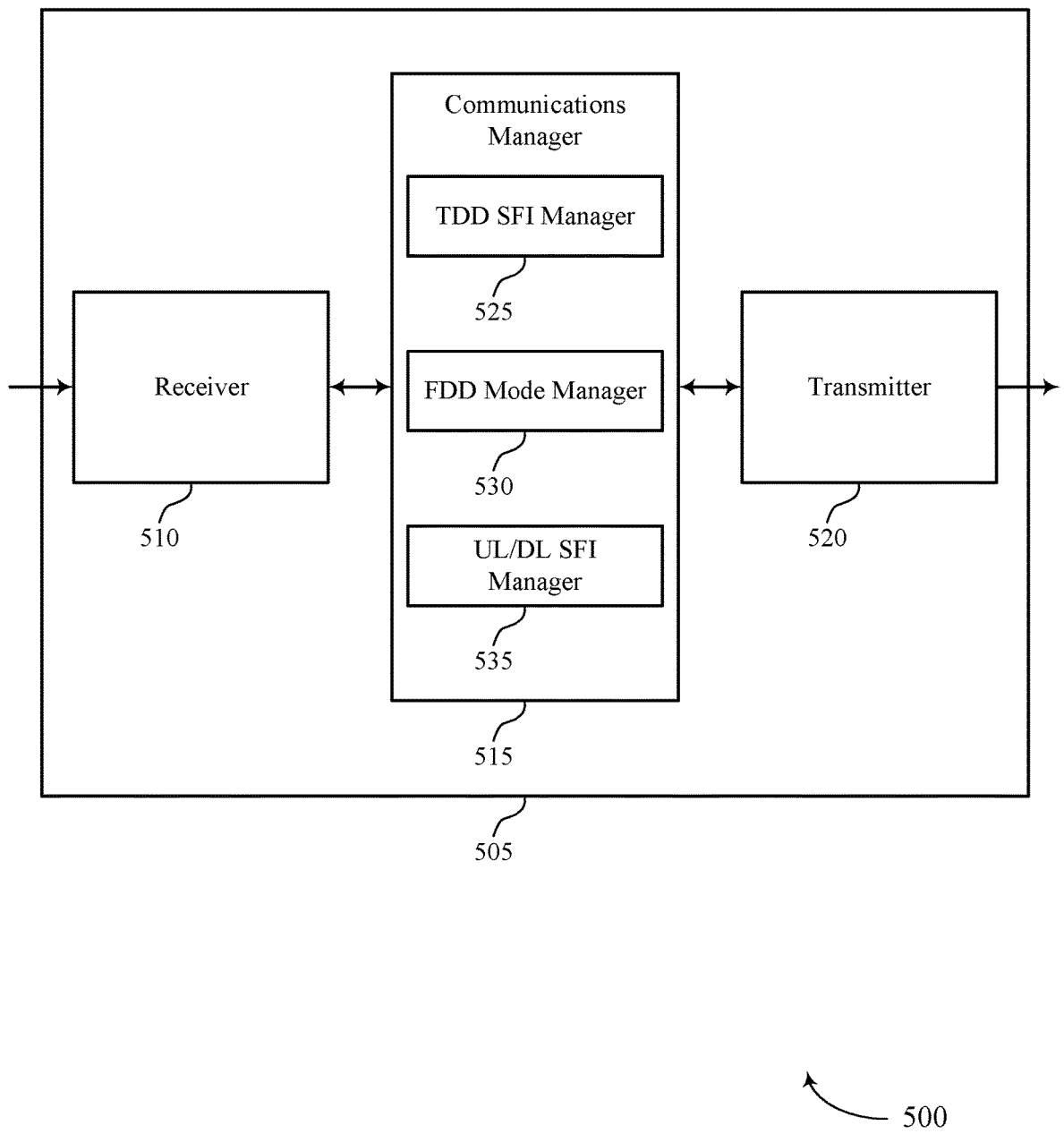

FIG. 5 shows a block diagram 500 of a wireless device 505 that supports SFI in FDD in accordance with aspects of the present disclosure. Wireless device 505 may be an example of aspects of a wireless device 405 or a UE 115 as described with reference to FIG. 4. Wireless device 505 may include receiver 510, communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, information related to SFI in FDD). Information may be passed on to other components of the device. The receiver 510 may be an example of aspects of the transceiver 735 described with reference to FIG. 7. The receiver 510 may utilize a single antenna or a set of antennas.

Communications manager 515 may be an example of aspects of the communications manager 715 described with reference to FIG. 7.

Communications manager 515 may also include TDD SFI manager 525, FDD mode manager 530, and UL/DL SFI manager 535.

TDD SFI manager 525 may receive a TDD SFI for a slot and receive a TDD multi-slot SFI for a set of slots.

FDD mode manager 530 may identify that the UE is operating in an FDD mode.

UL/DL SFI manager 535 may determine, based on the FDD mode, a downlink slot format and an uplink slot format from the TDD SFI. Additionally or alternatively, SFI manager 535 may determine, based on the FDD mode and the TDD multi-slot SFI, a downlink slot format and an uplink slot format for a subset of the set of slots.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may utilize a single antenna or a set of antennas.

In some cases, transmitter 520, in conjunction with receiver 510, may communicate with a base station based on the downlink slot format or the uplink slot format.

Figure 6:
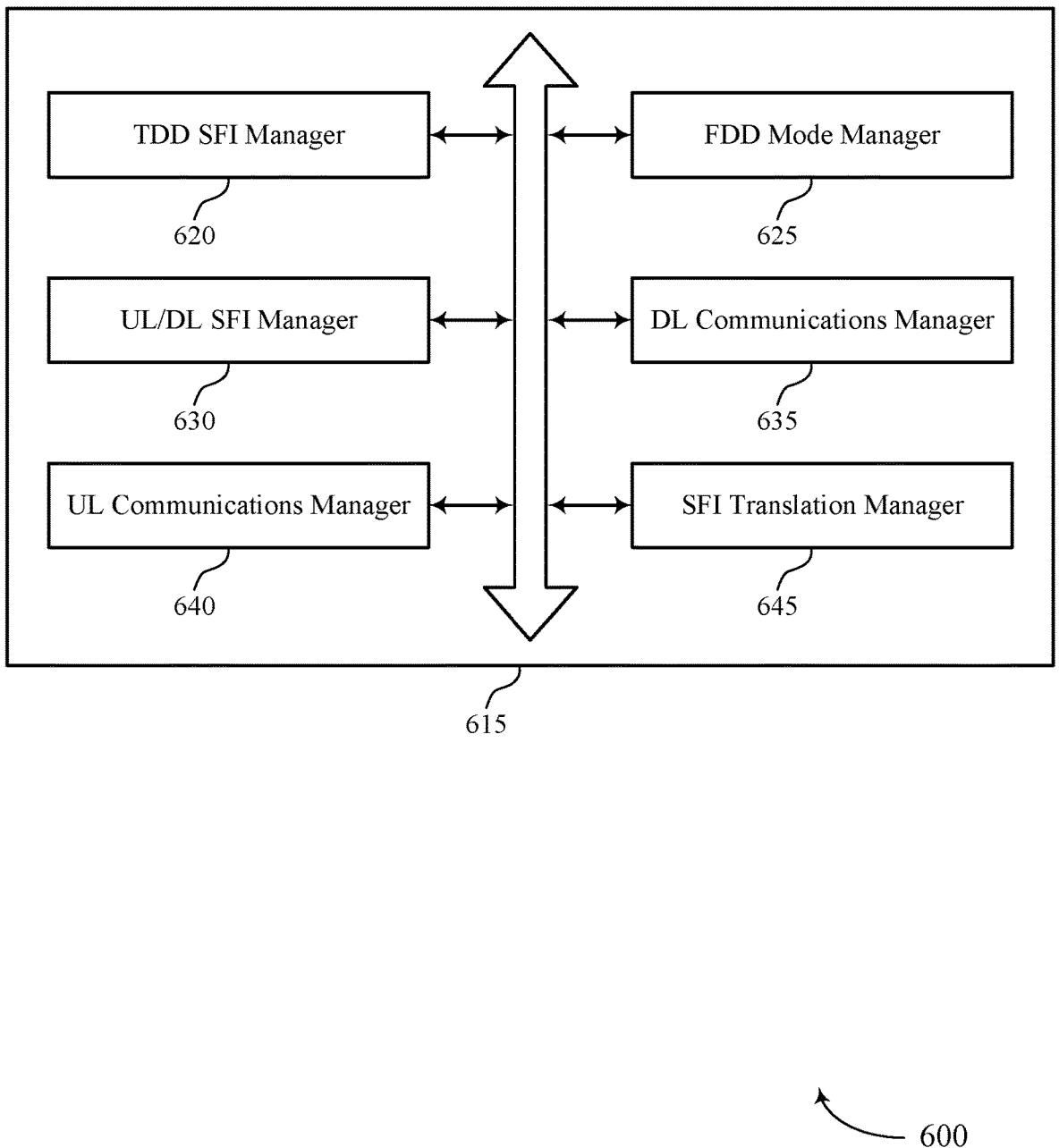

FIG. 6 shows a block diagram 600 of a communications manager 615 that supports SFI in FDD in accordance with aspects of the present disclosure. The communications manager 615 may be an example of aspects of a communications manager 415, a communications manager 515, or a communications manager 715 described with reference to FIGS. 4, 5, and 7. The communications manager 615 may include TDD SFI manager 620, FDD mode manager 625, UL/DL SFI manager 630, DL communications manager 635, UL communications manager 640, and SFI translation manager 645. Each of these modules may communicate, directly or indirectly, with one another (e.g., via one or more buses).

TDD SFI manager 620 may receive a TDD SFI for a slot and receive a TDD multi-slot SFI for a set of slots.

FDD mode manager 625 may identify that the UE is operating in an FDD mode.

UL/DL SFI manager 630 may determine, based on the FDD mode, a downlink slot format and an uplink slot format from the TDD SFI. Additionally or alternatively, SFI manager 630 may determine, based on the FDD mode and the TDD multi-slot SFI, a downlink slot format and an uplink slot format for a subset of the set of slots.

DL communications manager 635 may perform downlink communications during the slot in accordance with the downlink slot format and perform downlink communications during the subset of the set of slots in accordance with the downlink slot format.

UL communications manager 640 may perform uplink communications during the slot in accordance with the uplink slot format and perform uplink communications during the subset of the set of slots in accordance with the uplink slot format.

SFI translation manager 645 may omit the symbol format from the downlink slot format, omit the symbol format from the uplink slot format, and determine the uplink slot format based on a second portion of the multi-slot SFI. In some cases, determining the downlink slot format and the uplink slot format includes: extending a length of each symbol format of the TDD SFI by a defined factor. In some cases, determining the downlink slot format includes determining that a symbol format occurring in a first portion of the TDD SFI corresponds to an uplink symbol format. In some cases, determining the uplink slot format includes determining that a symbol format occurring in a second portion of the TDD SFI corresponds to a downlink symbol format.

In some cases, SFI translation manager 645 may determine the downlink slot format based on a first portion of the TDD multi-slot SFI and determine the uplink slot format based on a second portion of the TDD multi-slot SFI. In some cases, SFI translation manager 645 may determine the downlink slot format based on one or more slot format indicators for a first group of slots of the set and determine the uplink slot format based on one or more slot format indicators for a second group of slots of the set. In some cases, the first group of slots of the set may include one or more odd-numbered slots of the set and the second group of slots of the set may include one or more even-numbered slots of the set. In some cases, slots of the first group of slots and slots of the second group of slots may alternate within the set of slots.

In some cases, SFI translation manager 645 may determine a first slot format indicator for a first slot of the set and a second slot format indicator for a second slot of the set, where the first slot may precede the second slot and allocate the first slot format indicator as the downlink slot format for the first slot and the second slot format indicator as the uplink slot format for the first slot. In some cases, the first slot may immediately precede the second slot. In some cases, SFI translation manager 645 may determine a third slot format indicator for a third slot of the set and a fourth slot format indicator for a fourth slot of the set, where the third slot precedes the fourth slot and allocate the third slot format indicator as the downlink slot format for the second slot and the fourth slot format indicator as the uplink slot format for the second slot.

Figure 7:
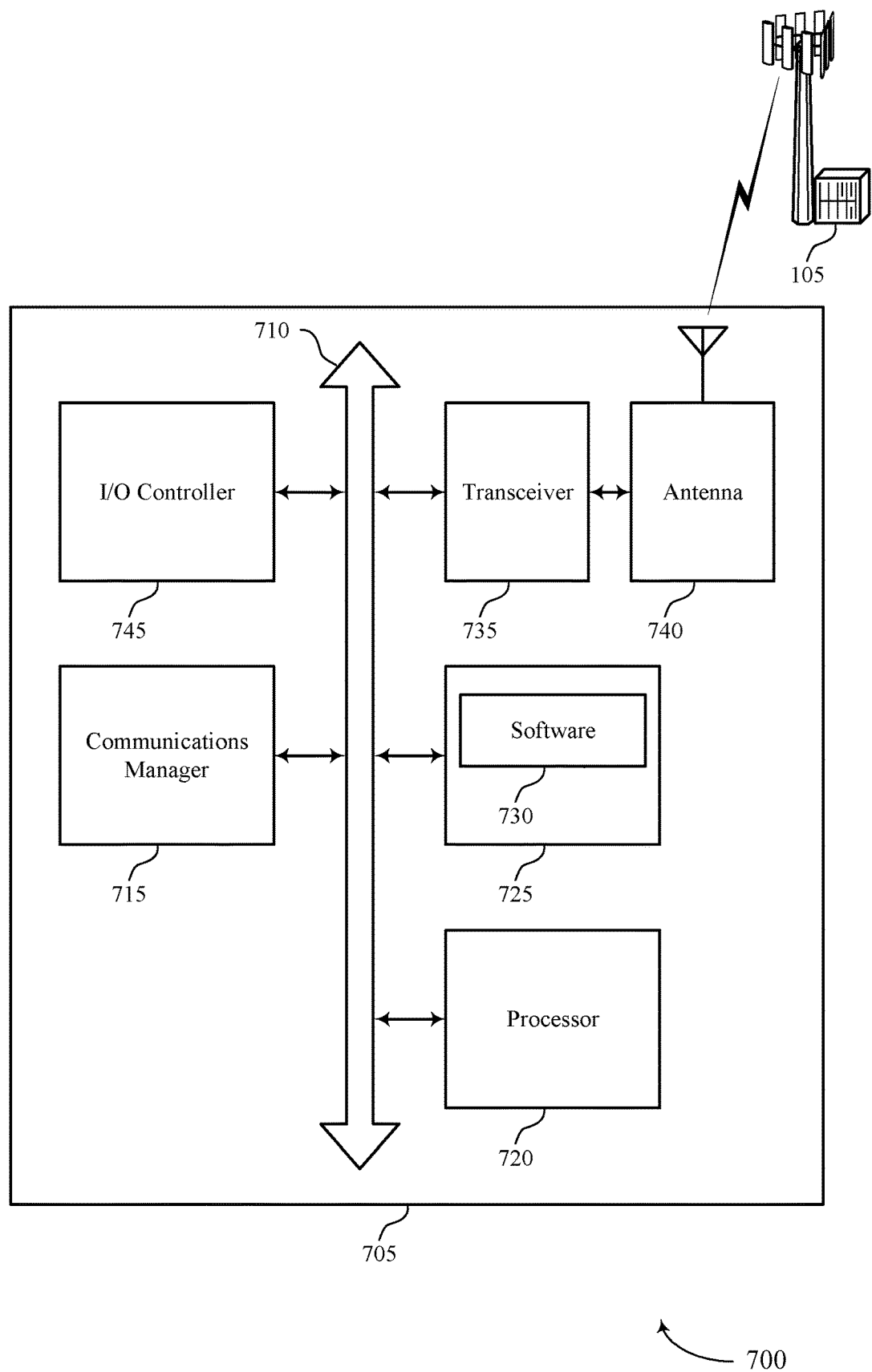
FIG. 7 illustrates a block diagram of a system including a UE that supports SFI in FDD in accordance with aspects of the present disclosure.

FIG. 7 shows a diagram of a system 700 including a device 705 that supports SFI in FDD in accordance with aspects of the present disclosure. Device 705 may be an example of or include the components of wireless device 405, wireless device 505, or a UE 115 as described above, e.g., with reference to FIGS. 4 and 5. Device 705 may include components for bi-directional voice and data communications including components for transmitting and receiving communications, including communications manager 715, processor 720, memory 725, software 730, transceiver 735, antenna 740, and I/O controller 745. These components may be in electronic communication via one or more buses (e.g., bus 710). Device 705 may communicate wirelessly with one or more base stations 105.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting SFI in FDD).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Software 730 may include code to implement aspects of the present disclosure, including code to support SFI in FDD. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas. In some cases, transceiver 735 may communicate with a base station based on the downlink slot format or the uplink slot format.

In some cases, the wireless device may include a single antenna 740. However, in some cases the device may have more than one antenna 740, which may be capable of concurrently transmitting or receiving multiple wireless transmissions.

I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system. In other cases, I/O controller 745 may represent or interact with a modem, a keyboard, a mouse, a touchscreen, or a similar device. In some cases, I/O controller 745 may be implemented as part of a processor. In some cases, a user may interact with device 705 via I/O controller 745 or via hardware components controlled by I/O controller 745.

Figure 8:
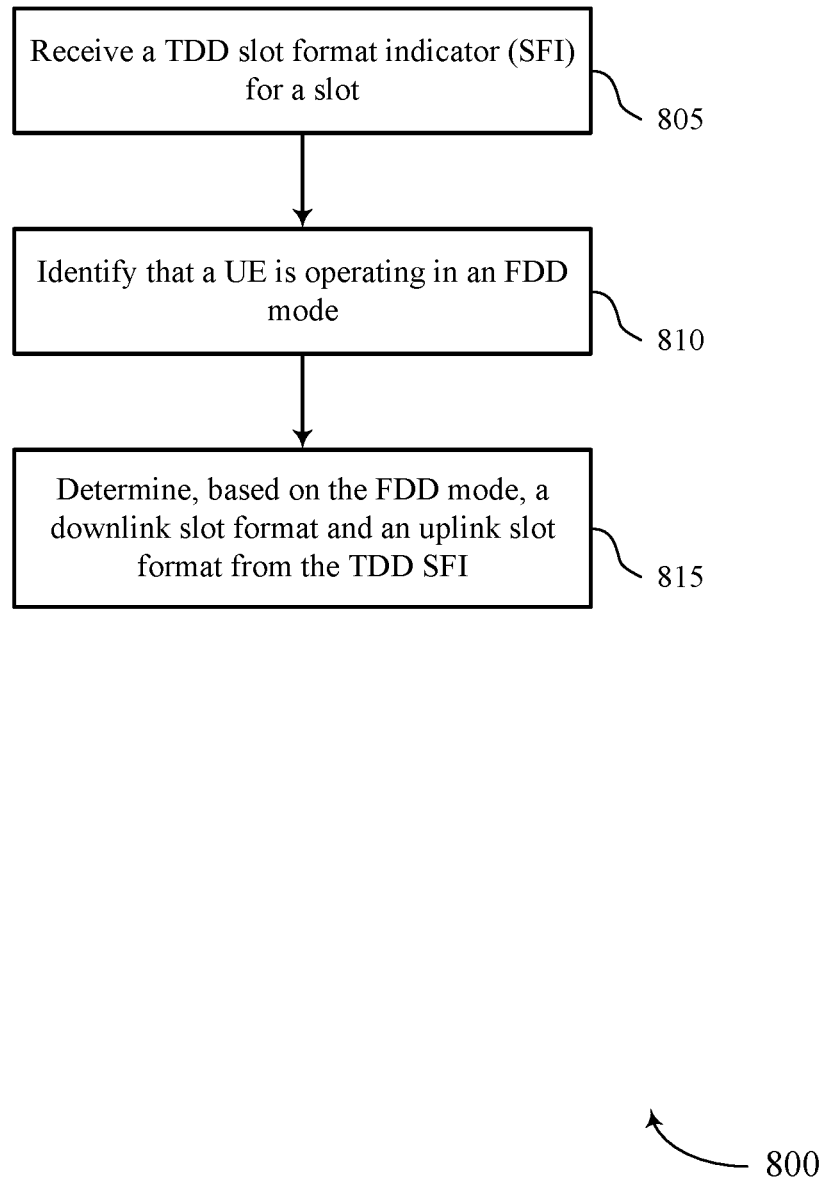
FIGS. 8 through 10 illustrate methods for SFI in FDD in accordance with aspects of the present disclosure.

FIG. 8 shows a flowchart illustrating a method 800 for SFI in FDD in accordance with aspects of the present disclosure. The operations of method 800 may be implemented by a UE 115 or its components as described herein. For example, the operations of method 800 may be performed by a communications manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At 805 the UE 115 may receive a TDD SFI for a slot. The operations of 805 may be performed according to the methods described herein. In certain examples, aspects of the operations of 805 may be performed by a TDD SFI manager as described with reference to FIGS. 4 through 7.

At 810 the UE 115 may identify that the UE is operating in an FDD mode. The operations of 810 may be performed according to the methods described herein. In certain examples, aspects of the operations of 810 may be performed by an FDD mode manager as described with reference to FIGS. 4 through 7.

At 815 the UE 115 may determine, based on the FDD mode, a downlink slot format and an uplink slot format from the TDD SFI. The operations of 815 may be performed according to the methods described herein. In certain examples, aspects of the operations of 815 may be performed by a UL/DL SFI manager as described with reference to FIGS. 4 through 7.

Figure 9:
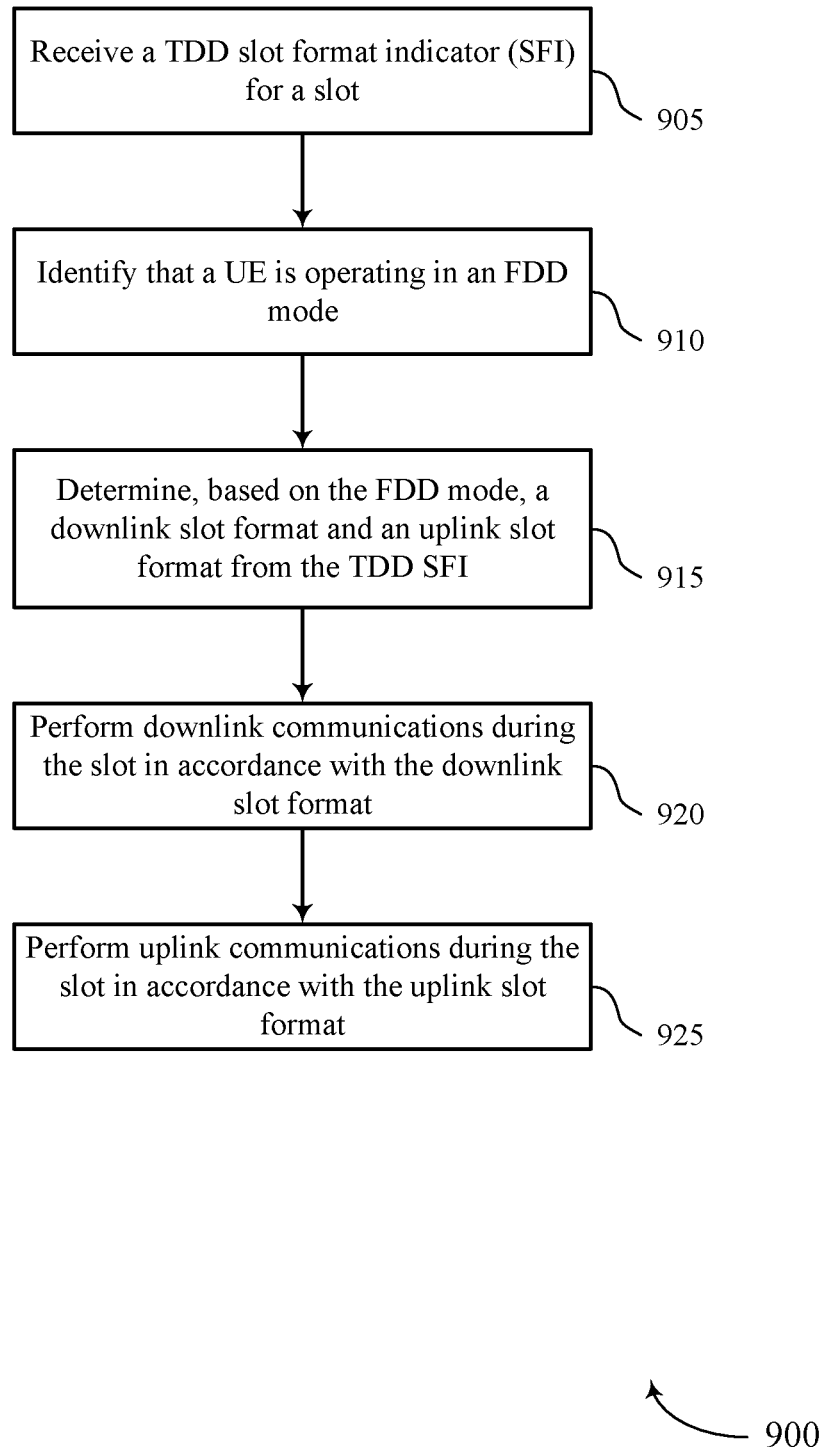

FIG. 9 shows a flowchart illustrating a method 900 for SFI in FDD in accordance with aspects of the present disclosure. The operations of method 900 may be implemented by a UE 115 or its components as described herein. For example, the operations of method 900 may be performed by a communications manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At 905 the UE 115 may receive a time division duplexing (TDD) slot format indicator (SFI) for a slot. The operations of 905 may be performed according to the methods described herein. In certain examples, aspects of the operations of 905 may be performed by a TDD SFI manager as described with reference to FIGS. 4 through 7.

At 910 the UE 115 may identify that the UE is operating in an FDD mode. The operations of 910 may be performed according to the methods described herein. In certain examples, aspects of the operations of 910 may be performed by an FDD mode manager as described with reference to FIGS. 4 through 7.

At 915 the UE 115 may determine, based on the FDD mode, a downlink slot format and an uplink slot format from the TDD SFI. The operations of 915 may be performed according to the methods described herein. In certain examples, aspects of the operations of 915 may be performed by a UL/DL SFI manager as described with reference to FIGS. 4 through 7.

At 920 the UE 115 may perform downlink communications during the slot in accordance with the downlink slot format. The operations of 920 may be performed according to the methods described herein. In certain examples, aspects of the operations of 920 may be performed by a DL communications manager as described with reference to FIGS. 4 through 7.

At 925 the UE 115 may perform uplink communications during the slot in accordance with the uplink slot format. The operations of 925 may be performed according to the methods described herein. In certain examples, aspects of the operations of 925 may be performed by a UL communications manager as described with reference to FIGS. 4 through 7.

Figure 10:
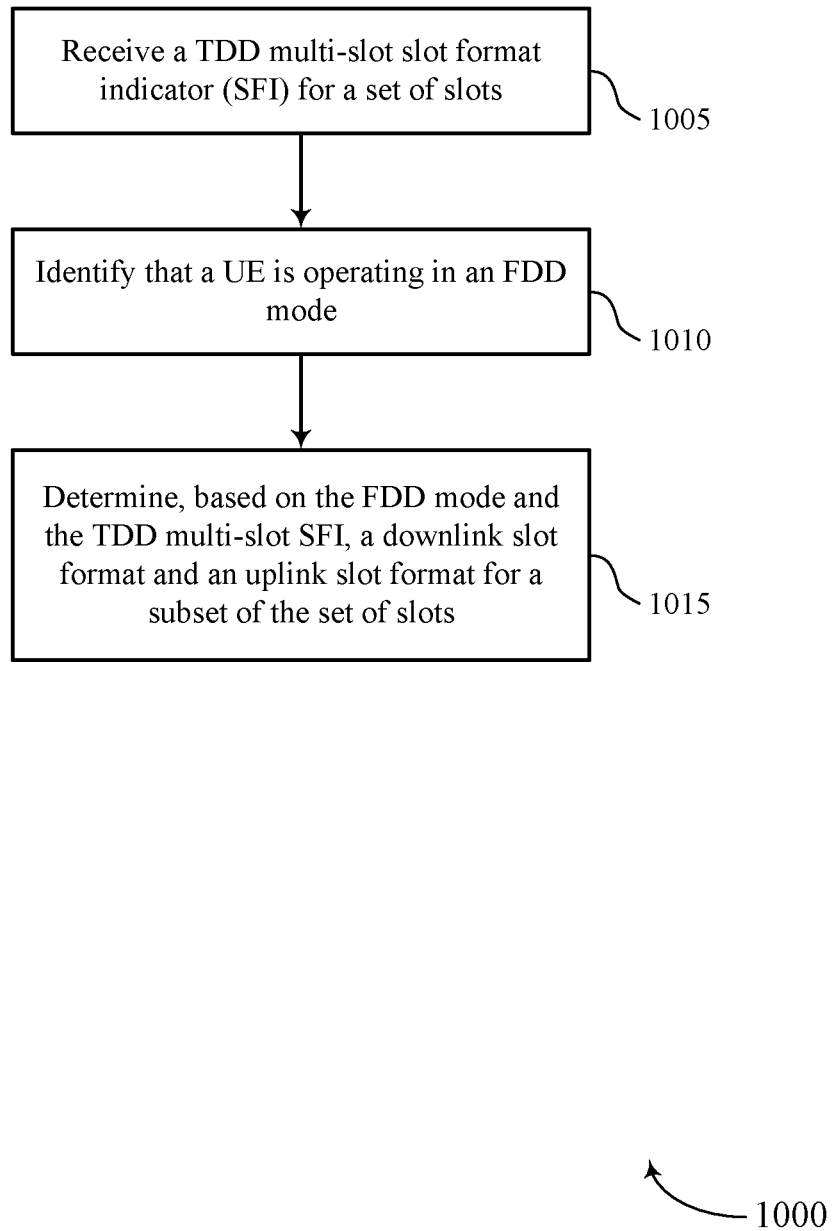

FIG. 10 shows a flowchart illustrating a method 1000 for SFI in FDD in accordance with aspects of the present disclosure. The operations of method 1000 may be implemented by a UE 115 or its components as described herein. For example, the operations of method 1000 may be performed by a communications manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At 1005 the UE 115 may receive a TDD multi-slot SFI for a set of slots. The operations of 1005 may be performed according to the methods described herein. In certain examples, aspects of the operations of 1005 may be performed by a TDD SFI manager as described with reference to FIGS. 4 through 7.

At 1010 the UE 115 may identify that the UE is operating in an FDD mode. The operations of 1010 may be performed according to the methods described herein. In certain examples, aspects of the operations of 1010 may be performed by an FDD mode manager as described with reference to FIGS. 4 through 7.

At 1015 the UE 115 may determine, based on the FDD mode and the TDD multi-slot SFI, a downlink slot format and an uplink slot format for a subset of the set of slots. The operations of 1015 may be performed according to the methods described herein. In certain examples, aspects of the operations of 1015 may be performed by a UL/DL SFI manager as described with reference to FIGS. 4 through 7.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving a time division duplexing (TDD) multi-slot slot format indicator (SFI) for a set of slots;

identifying that a UE is operating in a frequency division duplexing (FDD) mode;
determining, based at least in part on the FDD mode and the TDD multi-slot SFI, a downlink slot format and an uplink slot format for a subset of the set of slots;
wherein determining the downlink slot format and the uplink slot format comprises:
  determining a first slot format indicator for a first slot of the set and a second slot format indicator for a second slot of the set, wherein the first slot precedes the second slot;
  allocating the first slot format indicator as the downlink slot format for the first slot and the second slot format indicator as the uplink slot format for the first slot;
  determining a third slot format indicator for a third slot of the set and a fourth slot format indicator for a fourth slot of the set, wherein the third slot precedes the fourth slot; and
  allocating the third slot format indicator as the downlink slot format for the second slot and the fourth slot format indicator as the uplink slot format for the second slot.

2. The method of claim 1, further comprising:
performing downlink communications during the subset of the set of slots in accordance with the downlink slot format; and
performing uplink communications during the subset of the set of slots in accordance with the uplink slot format.

3. The method of claim 1, wherein determining the downlink slot format and the uplink slot format comprises:
determining the downlink slot format based at least in part on a first portion of the TDD multi-slot SFI; and
determining the uplink slot format based at least in part on a second portion of the TDD multi-slot SFI.

4. The method of claim 1, wherein determining the downlink slot format and the uplink slot format comprises:
determining the downlink slot format based at least in part on one or more slot format indicators for a first group of slots of the set; and
determining the uplink slot format based at least in part on one or more slot format indicators for a second group of slots of the set.

5. The method of claim 4, wherein:
the first group of slots of the set comprises one or more odd-numbered slots of the set; and
the second group of slots of the set comprises one or more even-numbered slots of the set.

6. The method of claim 4, wherein slots of the first group of slots and slots of the second group of slots alternate within the set of slots.

7. The method of claim 1, wherein the first slot immediately precedes the second slot.

8. The method of claim 1, further comprising:
communicating with a base station based at least in part on the downlink slot format or the uplink slot format.

9. An apparatus for wireless communication, comprising:
means for receiving a time division duplexing (TDD) multi-slot slot format indicator (SFI) for a set of slots;
means for identifying that a UE is operating in a frequency division duplexing (FDD) mode;
means for determining, based at least in part on the FDD mode, a downlink slot format and an uplink slot format for a subset of the set of slots from the TDD multi-slot SFI;
wherein the means for determining the downlink slot format and the uplink slot format comprises:
  means for determining a first slot format indicator for a first slot of the set and a second slot format indicator for a second slot of the set, wherein the first slot precedes the second slot;
  means for allocating the first slot format indicator as the downlink slot format for the first slot and the second slot format indicator as the uplink slot format for the first slot;
  means for determining a third slot format indicator for a third slot of the set and a fourth slot format indicator for a fourth slot of the set, wherein the third slot precedes the fourth slot; and
  means for allocating the third slot format indicator as the downlink slot format for the second slot and the fourth slot format indicator as the uplink slot format for the second slot.

10. The apparatus of claim 9, further comprising:
means for performing downlink communications during the subset of the set of slots in accordance with the downlink slot format; and
means for performing uplink communications during the subset of the set of slots in accordance with the uplink slot format.

11. The apparatus of claim 9, wherein the means for determining the downlink slot format and the uplink slot format comprises:
means for determining the downlink slot format based at least in part on a first portion of the TDD multi-slot SFI; and
means for determining the uplink slot format based at least in part on a second portion of the TDD multi-slot SFI.

12. The apparatus of claim 9, wherein the means for determining the downlink slot format and the uplink slot format comprises:
means for determining the downlink slot format based at least in part on one or more slot format indicators for a first group of slots of the set; and
means for determining the uplink slot format based at least in part on one or more slot format indicators for a second group of slots of the set.

13. The apparatus of claim 12, wherein:
the first group of slots of the set comprises one or more odd-numbered slots of the set; and
the second group of slots of the set comprises one or more even-numbered slots of the set.

14. The apparatus of claim 12, wherein slots of the first group of slots and slots of the second group of slots alternate within the set of slots.

15. The apparatus of claim 9, wherein the first slot immediately precedes the second slot.

16. The apparatus of claim 9, further comprising:
means for communicating with a base station based at least in part on the downlink slot format or the uplink slot format.

17. An apparatus for wireless communication, comprising:
a processor;
memory in electronic communication with the processor; and
instructions stored in the memory and executable by the processor to cause the apparatus to:
  receive a time division duplexing (TDD) multi-slot slot format indicator (SFI) for a set of slots;
  identify that a UE is operating in a frequency division duplexing (FDD) mode;

determine, based at least in part on the FDD mode, a downlink slot format and an uplink slot format for a subset of the set of slots from the TDD multi-slot SFI;
wherein the instructions to determine the downlink slot format and the uplink slot format are executable by the processor to cause the apparatus to:
determine a first slot format indicator for a first slot of the set and a second slot format indicator for a second slot of the set, wherein the first slot precedes the second slot;
allocate the first slot format indicator as the downlink slot format for the first slot and the second slot format indicator as the uplink slot format for the first slot;
determine a third slot format indicator for a third slot of the set and a fourth slot format indicator for a fourth slot of the set, wherein the third slot precedes the fourth slot; and
allocate the third slot format indicator as the downlink slot format for the second slot and the fourth slot format indicator as the uplink slot format for the second slot.

18. The apparatus of claim 17, wherein the instructions are further executable by the processor to cause the apparatus to:
perform downlink communications during the subset of the set of slots in accordance with the downlink slot format; and
perform uplink communications during the subset of the set of slots in accordance with the uplink slot format.

19. The apparatus of claim 17, wherein the instructions to determine the downlink slot format and the uplink slot format are executable by the processor to cause the apparatus to:
determine the downlink slot format based at least in part on a first portion of the TDD multi-slot SFI; and
determine the uplink slot format based at least in part on a second portion of the TDD multi-slot SFI.

20. The apparatus of claim 17, wherein the instructions to determine the downlink slot format and the uplink slot format are executable by the processor to cause the apparatus to:
determine the downlink slot format based at least in part on one or more slot format indicators for a first group of slots of the set; and
determine the uplink slot format based at least in part on one or more slot format indicators for a second group of slots of the set.

21. The apparatus of claim 20, wherein:
the first group of slots of the set comprises one or more odd-numbered slots of the set; and
the second group of slots of the set comprises one or more even-numbered slots of the set.

22. The apparatus of claim 20, wherein slots of the first group of slots and slots of the second group of slots alternate within the set of slots.

23. The apparatus of claim 17, wherein the first slot immediately precedes the second slot.

24. The apparatus of claim 17, wherein the instructions are further executable by the processor to cause the apparatus to:
communicate with a base station based at least in part on the downlink slot format or the uplink slot format.

25. A non-transitory computer-readable medium storing code for wireless communication, the code comprising instructions executable by a processor to:
receive a time division duplexing (TDD) multi-slot slot format indicator (SFI) for a set of slots;
identify that a UE is operating in a frequency division duplexing (FDD) mode;
determine, based at least in part on the FDD mode, a downlink slot format and an uplink slot format for a subset of the set of slots from the TDD multi-slot SFI;
wherein the instructions to determine the downlink slot format and the uplink slot format are executable by the processor to:
determine a first slot format indicator for a first slot of the set and a second slot format indicator for a second slot of the set, wherein the first slot precedes the second slot;
allocate the first slot format indicator as the downlink slot format for the first slot and the second slot format indicator as the uplink slot format for the first slot;
determine a third slot format indicator for a third slot of the set and a fourth slot format indicator for a fourth slot of the set, wherein the third slot precedes the fourth slot; and
allocate the third slot format indicator as the downlink slot format for the second slot and the fourth slot format indicator as the uplink slot format for the second slot.

26. The non-transitory computer-readable medium of claim 25, wherein the instructions are further executable by the processor to:
perform downlink communications during the subset of the set of slots in accordance with the downlink slot format; and
perform uplink communications during the subset of the set of slots in accordance with the uplink slot format.

27. The non-transitory computer-readable medium of claim 25, wherein the instructions to determine the downlink slot format and the uplink slot format are executable by the processor to:
determine the downlink slot format based at least in part on a first portion of the TDD multi-slot SFI; and
determine the uplink slot format based at least in part on a second portion of the TDD multi-slot SFI.

28. The non-transitory computer-readable medium of claim 25, wherein the instructions to determine the downlink slot format and the uplink slot format are executable by the processor to:
determine the downlink slot format based at least in part on one or more slot format indicators for a first group of slots of the set; and
determine the uplink slot format based at least in part on one or more slot format indicators for a second group of slots of the set.

29. The non-transitory computer-readable medium of claim 28, wherein:
the first group of slots of the set comprises one or more odd-numbered slots of the set; and
the second group of slots of the set comprises one or more even-numbered slots of the set.

30. The non-transitory computer-readable medium of claim 28, wherein slots of the first group of slots and slots of the second group of slots alternate within the set of slots.

31. The non-transitory computer-readable medium of claim 25, wherein the first slot immediately precedes the second slot.

32. The non-transitory computer-readable medium of claim 25, wherein the instructions are further executable by the processor to:
communicate with a base station based at least in part on the downlink slot format or the uplink slot format.

* * * * *